United States Patent
Lupke et al.

(10) Patent No.: US 6,905,325 B2
(45) Date of Patent: Jun. 14, 2005

(54) PIPE MOLD WITH COMPENSATION FOR PIPE SHRINKAGE

(76) Inventors: Manfred A. A. Lupke, 92 Elgin Street, Thornhill, Ontario (CA), L3T 1W6; Stefan A. Lupke, 32 Vintage Lane, Thornhill, Ontario (CA), L3T 1X6

( * ) Notice: Subject to any disclaimer, the term of this patent is extended or adjusted under 35 U.S.C. 154(b) by 163 days.

(21) Appl. No.: 10/258,453

(22) PCT Filed: May 1, 2001

(86) PCT No.: PCT/CA01/00594
§ 371 (c)(1),
(2), (4) Date: Oct. 24, 2002

(87) PCT Pub. No.: WO01/85432
PCT Pub. Date: Nov. 15, 2001

(65) Prior Publication Data
US 2003/0138514 A1 Jul. 24, 2003

(30) Foreign Application Priority Data
May 8, 2000 (CA) .............................................. 2307798

(51) Int. Cl.[7] ............................................. B29C 47/12
(52) U.S. Cl. ...................... 425/325; 425/369; 425/336; 425/380; 264/508
(58) Field of Search .................................. 425/325, 369, 425/336, 326.1, 393, 396, 380, 461; 264/286, 508

(56) References Cited

U.S. PATENT DOCUMENTS

| 5,017,321 A | * | 5/1991 | Comfort | ...................... 264/167 |
| 5,510,071 A | * | 4/1996 | Van Wonderen et al. | ... 264/166 |
| 5,744,091 A | * | 4/1998 | Lupke | ........................ 264/508 |

FOREIGN PATENT DOCUMENTS

DE       200 11 666 U1 * 10/2000

* cited by examiner

Primary Examiner—Joseph S. Del Sole

(57) ABSTRACT

Pipe molding apparatus having a molding mold tunnel includes an upstream (3) and at least one downstream mold block (7). Each mold block (3, 5, 7) comprises mold block sections which close with one another to form the pipe and which open relative to one another to release the pipe. The mold blocks (3, 5, 7) move downstream of the apparatus together with one another when forming the pipe and move upstream separately from one another when releasing the pipe which cools and shrinks in both diameter and length in the mold tunnel. Each mold block (3, 5, 7) has a hollow pipe forming region with the pipe forming region of the downstream mold block being decreased in both diameter and length relative to the pipe forming region of the upstream mold block (3) to compensate for the plastic shrinkage.

4 Claims, 5 Drawing Sheets

PIPE MOLD WITH COMPENSATION FOR PIPE SHRINKAGE

FIELD OF THE INVENTION

The present invention relates to a pipe mold which compensates for plastic shrinkage during formation of the pipe in the mold.

BACKGROUND OF THE INVENTION

A well known method of making plastic pipe is through the use of a traveling tunnel of mold blocks which are fed plastic from an extruder. The plastic is formed into the shape of the pipe in the mold tunnel.

An inherent feature of the plastic is that it shrinks as it cools while moving down the mold tunnel. Some shrinkage can produce benefits such as creating a cooling medium receiving gap between the plastic and the mold blocks which has been taken advantage of by Corma Inc. of Toronto, Canada. However, if there is excessive shrinking then the gap becomes undesirably large.

A conventional moving mold tunnel which is one in which mold blocks circulate around an endless track is not easily adapted to compensate for plastic shrinkage in the mold tunnel. This is because the mold blocks forming the downstream end of the tunnel recirculate back to the upstream end of the tunnel. Accordingly, they must have an internal mold size consistent with the plastic dimension introduced at the upstream end of the tunnel before the plastic has had an opportunity to shrink.

SUMMARY OF THE PRESENT INVENTION

Corma Inc. has developed what they refer to as their Pulsating Corrugator. This corrugator is a pipe molding apparatus having a mold tunnel comprising an upstream and at least one downstream mold block. These mold blocks comprise mold block sections which close to form pipe and which open to release the pipe. The mold blocks move downstream of the apparatus together with one another when forming the pipe which cools and shrinks in both diameter and length when moving through the mold tunnel. The mold blocks then move upstream of the apparatus separately from one another when releasing the pipe. In this setup, the upstream mold block always maintains an upstream position relative to the downstream mold block and the mold blocks never pass one another.

Each mold block has an interior hollow pipe forming region. In accordance with the present invention, the hollow pipe forming region of the downstream mold block is decreased in both diameter and length relative to the hollow pipe forming region of the upstream mold block to compensate for the shrinking of the plastic used to make the pipe.

BRIEF DESCRIPTION OF THE DRAWINGS

The above as well as other advantages and features of the present invention will be described in greater detail according to the preferred embodiments of the present invention in which.

DETAILED DESCRIPTION ACCORDING TO THE PREFERRED EMBODIMENTS OF THE PRESENT INVENTION IN WHICH

Figure 1:
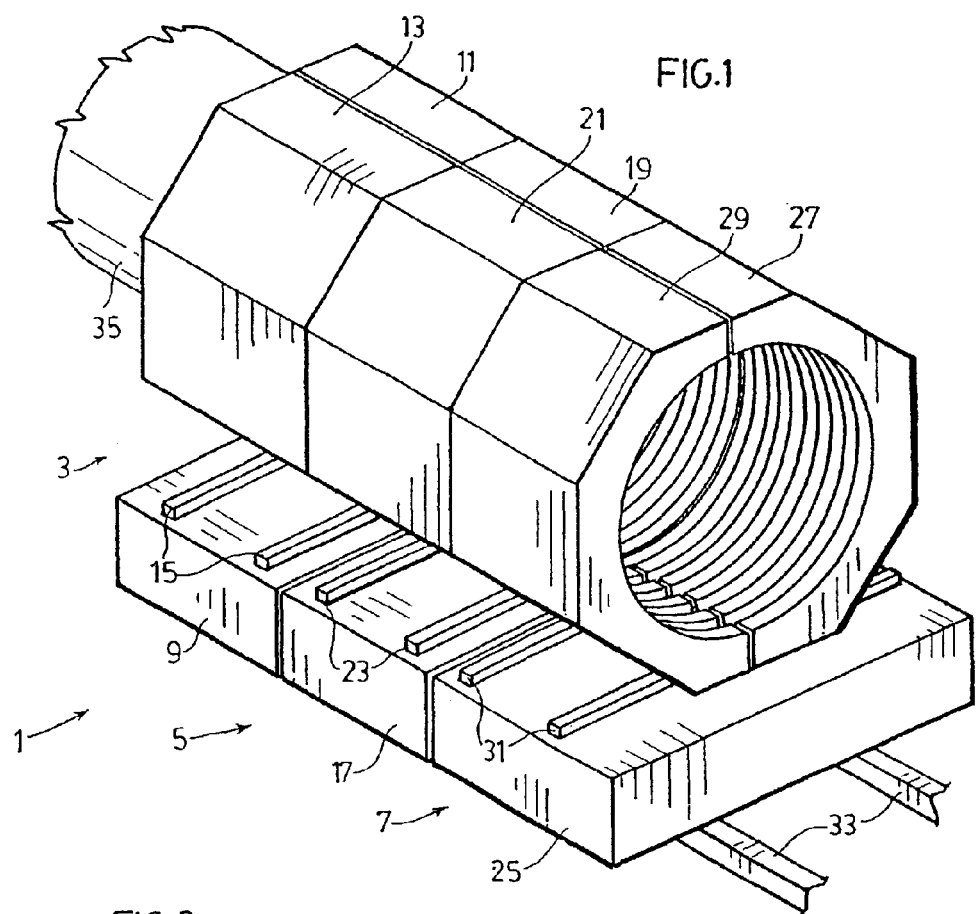
FIG. 1 is a perspective view of a pulsating corrugator for making plastic pipe with features for compensating for shrinkage of the plastic in the corrugator according to a preferred embodiment of the invention.

FIG. 1 shows a corrugator generally indicated at 1. This corrugator which comprises a plurality of moving mold blocks to be described later in detail, is fed plastic from an extruder (not shown) by an extruder head 35. The downstream end 36 of the extruder head 35 is located internally of the mold tunnel formed by the mold blocks.

In the embodiment shown, there are three mold blocks comprising an upstream mold block 3, an intermediate mold block 5 and a downstream mold block 7. The mold tunnel could however be made from only two mold blocks or it could be made with more than three mold blocks.

The upstream mold block comprises a base part 9 and mold block sections 11 and 13 slideably mounted on guides 15 of the base part.

The intermediate mold block comprises a base part 17 and mold block sections 19 and 21 slideably mounted on guides 23 of the base part.

The downstream mold block comprises a base part 25 and mold block sections 27 and 29 slideably mounted on guides 31 of the base part.

Each of the base parts 9, 17 and 25 are slideably mounted on guides 33.

Figure 8:
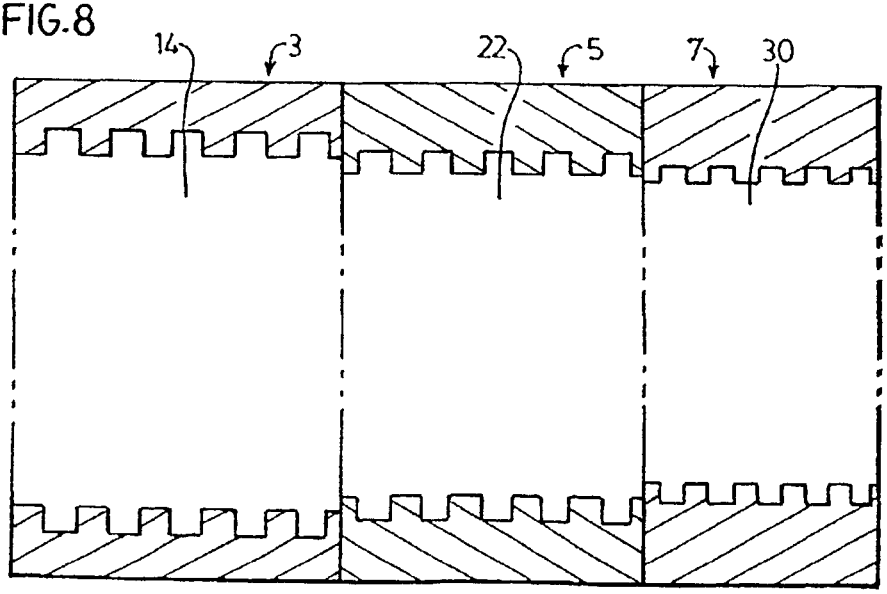
FIG. 8 is a sectional view through the corrugator of FIG. 1.

The mold block sections of each mold block open and close relative to one another as will also be described later in detail. When the mold block sections are closed each mold block defines a hollow interior region which forms part of the overall mold tunnel. FIG. 8 shows that mold block 3 has an interior hollow region 14, mold block 5 has a hollow interior region 22 and mold block 7 has a hollow interior region 3. All of these regions when combined form a generally cylindrical elongated hollow area with peripheral grooves. If the mold blocks are used to form smooth wall pipe, they do not include the grooves.

The mold blocks operate in the following manner having reference to FIGS. 2 through 6. In the FIG. 2 position, they are ready to receive the plastic from the extruder. The mold block sections are closed and the mold blocks abut one another.

Figure 5:
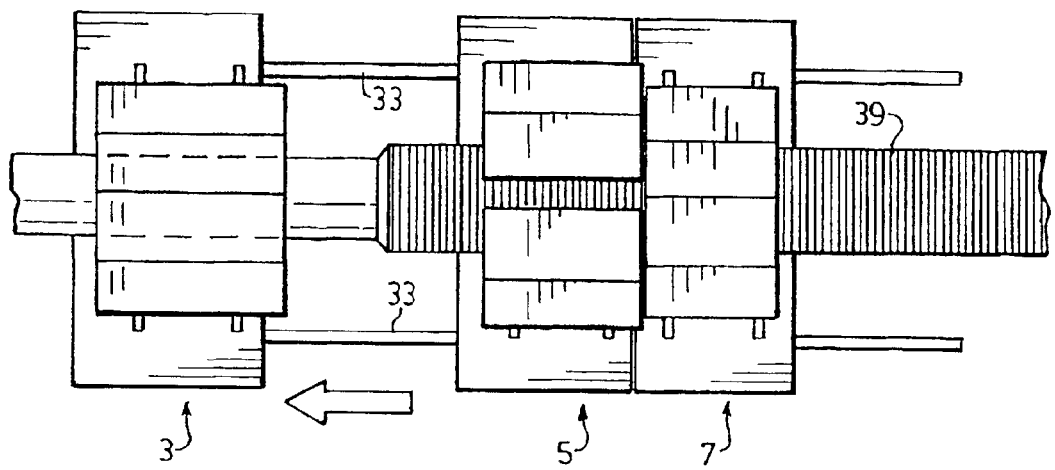
Figure 6:
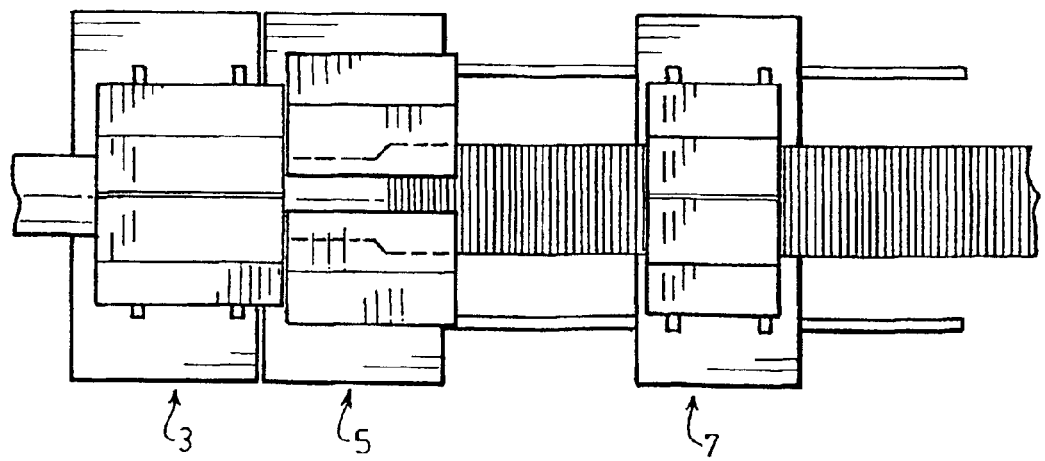
Figure 7:
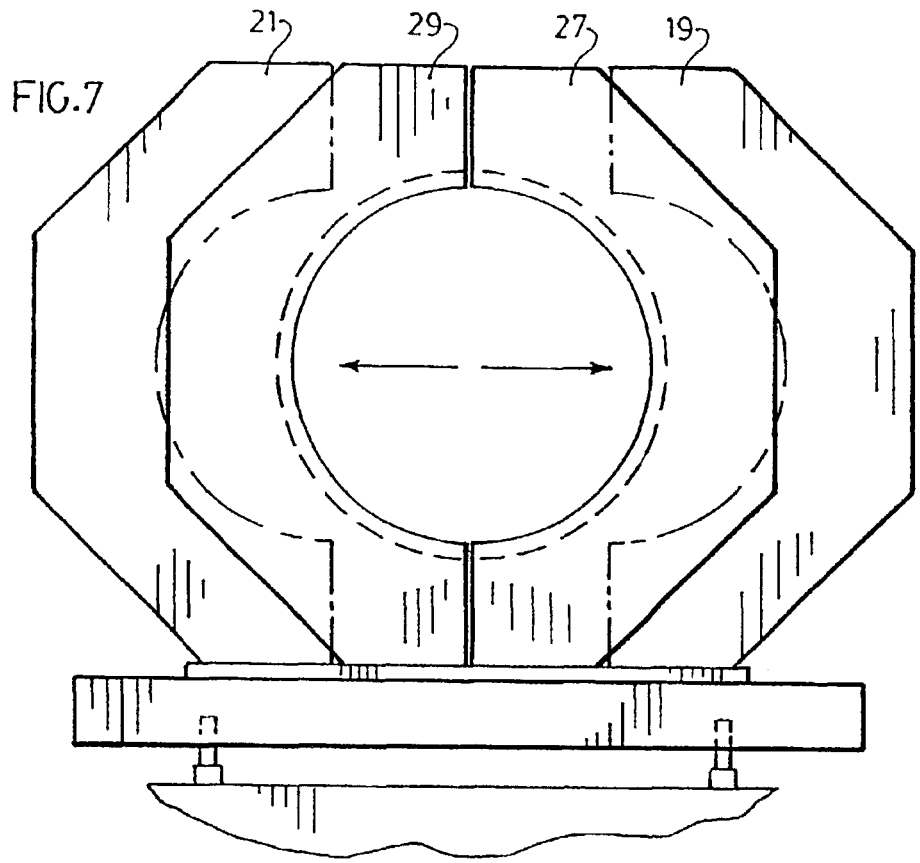
FIG. 7 is a front view of the corrugator of FIG. 6.

As the plastic flows into the mold tunnel formed by the side by side mold blocks, all of the mold blocks move on guides 33 downstream relative to the extruder head. They all continue to move together until they reach the FIG. 4 position where it should be noted the downstream end 36 of the extruder head remains within the mold tunnel, i.e. the mold blocks never move off of the extruder head. At this point, the mold block sections of the upstream mold block open by sliding away from one another on guides 15. The entire upstream mold block then slides in guides 33 in an upstream direction separately of the other mold blocks. The same thing then occurs in sequence with mold blocks 5 and 7 to release the pipe 39 from the mold tunnel as shown in FIGS. 5 and 6.

Figure 2:
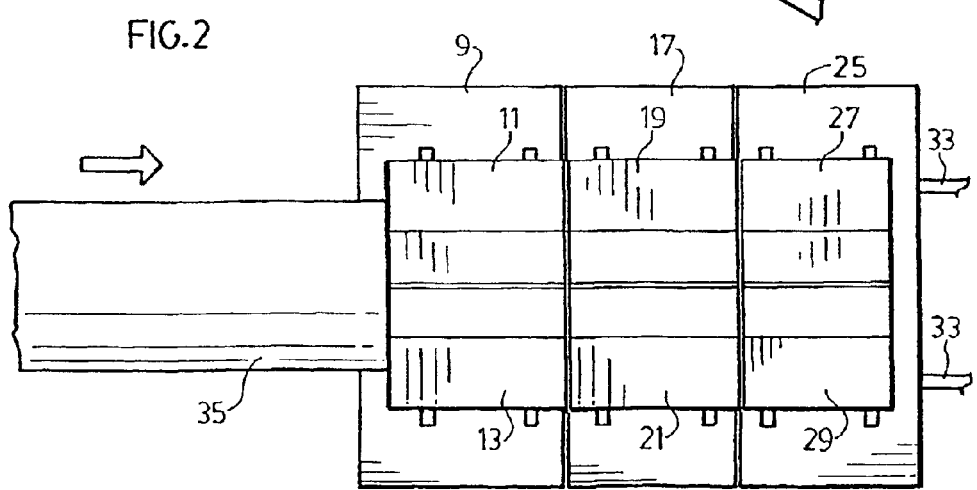
FIGS. 2 through 6 are top views of the corrugator of FIG. 1 in various different operating positions of the corrugator.
Figure 3:
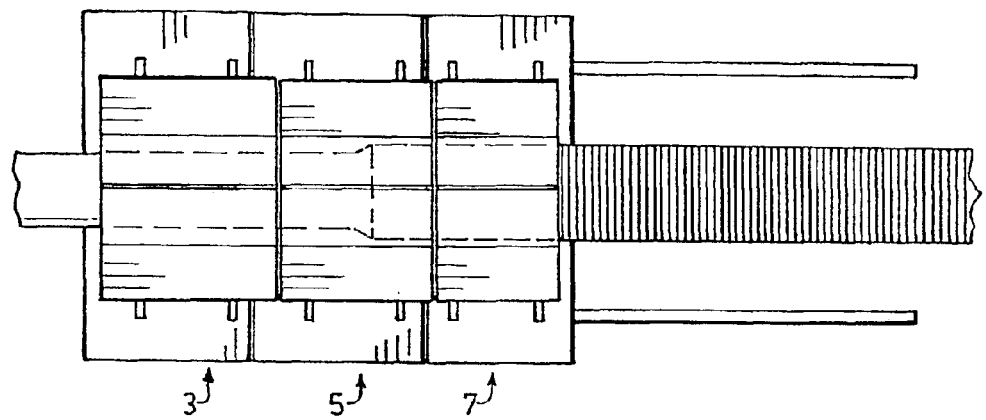
Figure 4:
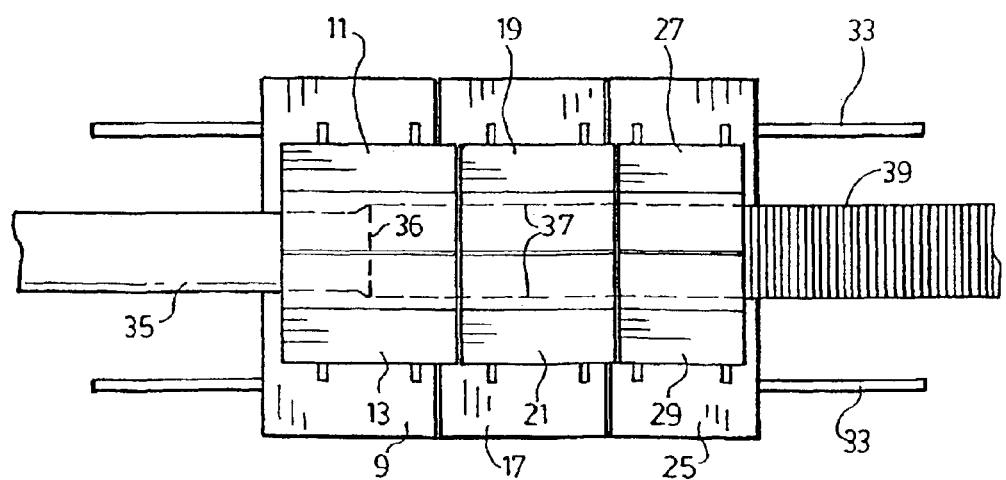

The mold blocks are now returned to the FIG. 2 position to continue the pipe forming part of the operation.

As was earlier described, the plastic used to form the pipe shrinks as it cools in the mold tunnel. One of the key features of the present invention is seen in FIG. 8 which shows that the interior hollow region 14 of mold block 3 is larger in both diameter and length than the interior region 22 of the intermediate mold block which is in turn larger than the interior region 30 of the downstream mold block. In order to accommodate these decreases, the actual mold blocks are decreased in length so that even with the downsizing the same pipe profile is found in each of the mold blocks.

More particularly, it will be seen that each mold block defines a pipe shape including five external ribs even though the ribs are smaller and closer together in each successive downstream mold block. In this way, the mold blocks are designed to compensate for the plastic shrinkage.

A prime reason for being able to achieve the above compensation is that in this pulsating corrugator, the mold blocks never move out of their relative positions and as such the upstream mold block with the longest internal region always remains in the upstream position where there is little plastic shrinkage while the downstream mold block always remains in the most downstream position where there is the most plastic shrinkage.

Figure 9:
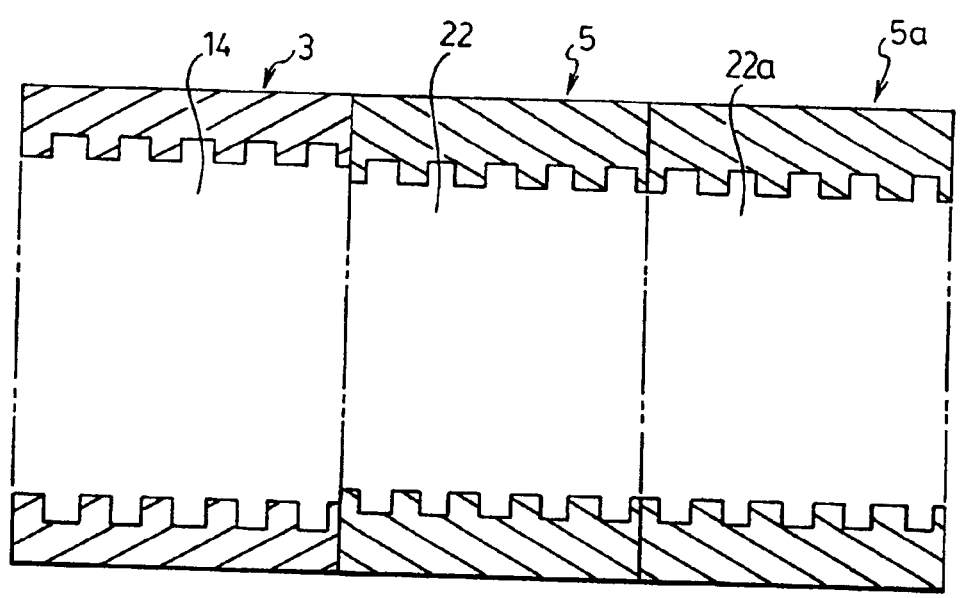
FIG. 9 is a sectional view through mold blocks of an alternate arrangement.

FIG. 8 shows the setup where there is a size difference between each of the mold blocks. The set up could also be one in which the upstream and the intermediate mold block are of the same size with only the downstream mold block being smaller. The embodiment of FIG. 9 includes an upstream mold block 3, an intermediate mold block 5 with interior space 22, a downstream mold block 5a with interior space 22a. The intermediate mold block 5 and the downstream mold block 5a are of the same size. Each of these mold blocks include a forming region that is decreased in both diameter and length relative to the forming region of the upstream mold block.

Although various preferred embodiments of the present invention have been described in detail, it will be appreciated by those skilled in the art that variations may be made without departing from the spirit of the invention or the scope of the appended claims.

The embodiments of the invention in which an exclusive property or privilege is claimed are defined as follows:

1. A pipe molding apparatus having a mold tunnel including an upstream and at least one downstream mold block, each mold block comprising mold block sections which close to form the pipe and which open to release the pipe, the mold blocks moving downstream of the apparatus together with one another when forming the pipe which cools and shrinks in both diameter and length when moving through the mold tunnel, and the mold blocks moving upstream of the apparatus separately from one another when releasing the pipe, each mold block having a hollow pipe forming region, the hollow pipe forming region of the downstream mold block being decreased in both diameter and length relative to the hollow pipe forming region of the upstream mold block to compensate for the shrinking of the pipe.

2. A pipe molding apparatus as claimed in claim 1, including an intermediate mold block between the upstream and the downstream mold blocks.

3. A pipe molding apparatus as claimed in claim 2, wherein said intermediate mold block has a hollow pipe forming region which is decreased in both diameter and length relative to the hollow pipe forming region in the upstream mold block and which is increased in diameter relative to the hollow pipe forming region in the downstream mold block.

4. A pipe molding apparatus as claimed in claim 2, wherein said intermediate mold block has a hollow pipe forming region which is decreased in both diameter and length relative to the hollow pipe forming region in the upstream mold block and which is consistent in both diameter and length relative to the hollow pipe forming region in the downstream mold block.

* * * * *